United States Patent

Hart et al.

[11] Patent Number: 5,935,439
[45] Date of Patent: Aug. 10, 1999

[54] SUCTION SYSTEM WITH END SUPPORTED INTERNAL CORE TUBE SUCTION STRAINERS

[75] Inventors: Gordon H. Hart, Shawnee; Gordon P. Pinsky, Olathe, both of Kans.

[73] Assignee: Performance Contracting, Inc., Shawnee, Kans.

[21] Appl. No.: 09/021,197

[22] Filed: Feb. 10, 1998

Related U.S. Application Data

[60] Provisional application No. 60/038,107, Feb. 19, 1997, and provisional application No. 60/067,931, Dec. 9, 1997.

[51] Int. Cl.$^6$ .......................... G21C 19/307; B01D 29/41; B01D 35/02; B01D 35/027
[52] U.S. Cl. ...................... 210/416.1; 210/346; 210/461; 210/486; 376/313
[58] Field of Search ................................ 210/416.1, 346, 210/461, 486; 376/313

[56] References Cited

U.S. PATENT DOCUMENTS

| | | |
|---|---|---|
| 1,329,171 | 1/1920 | Garry et al. . |
| 1,397,836 | 11/1921 | Karns . |
| 2,257,344 | 9/1941 | Maloney . |
| 2,622,683 | 12/1952 | Silitch et al. . |
| 2,696,264 | 12/1954 | Colmerauer et al. . |
| 2,837,032 | 6/1958 | Horsting, Sr. . |
| 2,973,814 | 3/1961 | Adams et al. . |
| 3,177,945 | 4/1965 | Fether . |
| 3,280,911 | 10/1966 | Strange et al. . |
| 3,357,564 | 12/1967 | Medford, Jr. et al. ................... 210/266 |
| 3,425,490 | 2/1969 | Clayton . |
| 3,683,056 | 8/1972 | Brandt et al. . |
| 4,014,387 | 3/1977 | Fink . |
| 4,376,091 | 3/1983 | Netkowicz et al. ..................... 376/283 |
| 4,624,319 | 11/1986 | Von Der Borght . |
| 5,120,494 | 6/1992 | Nazareno et al. . |
| 5,227,050 | 7/1993 | Stephan .................................. 210/106 |
| 5,232,048 | 8/1993 | Whitebay et al. . |
| 5,643,467 | 7/1997 | Romanco . |
| 5,696,801 | 12/1997 | Dwyer et al. ........................... 376/313 |
| 5,759,398 | 6/1998 | Kielbowicz . |
| 5,759,399 | 6/1998 | Balanin . |

FOREIGN PATENT DOCUMENTS 210461  7/1924  United Kingdom .

OTHER PUBLICATIONS

Sulzer Thermtec, Nuclear Service and Valves—Suction strainers with stringent requirements for the emergency cooling systems of nuclear power plants, 4 pp., Aug., 1995.
EUCASTREAM—Water Wells—EUPEN—Suction Flow Control Device, Aug., 1995, 12 pp.
Effect of Suction Flow Control Devices in Wells, G. Ehrhardt and R. Pelzer, 1992, 8 pp.
New Ideas for cylindrical Pipe Intakes Can Help Reduce Fish & larvae kills—RT Richards—1980—pp. 64–67.

*Primary Examiner*—Thomas M. Lithgow
*Attorney, Agent, or Firm*—Womble Carlyle Sandridge & Rice; Louis T. Isaf

[57] ABSTRACT

An elongated internal core tube suction strainer supported at its ends for use in a suction system is disclosed as is a suction system comprising the elongated suction strainer in combination with ECCS pipes in various support combinations. The elongated internal core tube suction strainer of this invention is particularly suited for use with boiling water reactor (BWR) and pressurized water reactor (PWR) nuclear power plants. Because of the flexibility of the suction strainer of this invention, the suction strainer can be adapted for use in a variety of reactor plants. The elongated suction strainer has an internal core tube defining a plurality of fluid inlets and an exterior filtering structure defining a plurality of perforations. When connected to one or more recirculation suction pipes of the suction system within the reservoir of a nuclear power plant (or other facility), the perforations and fluid inlets permit fluid to pass but prevent solids and other particulate matter from entering the suction system. The suction system is capable of withstanding the large loads associated with the hydrodynamic forces resulting from a loss of coolant accident while being supported only at its ends. The extended length of the elongated suction strainer and thus its greatly increased overall straining surface area is due to the structural strength provided by the internal core tube.

30 Claims, 14 Drawing Sheets

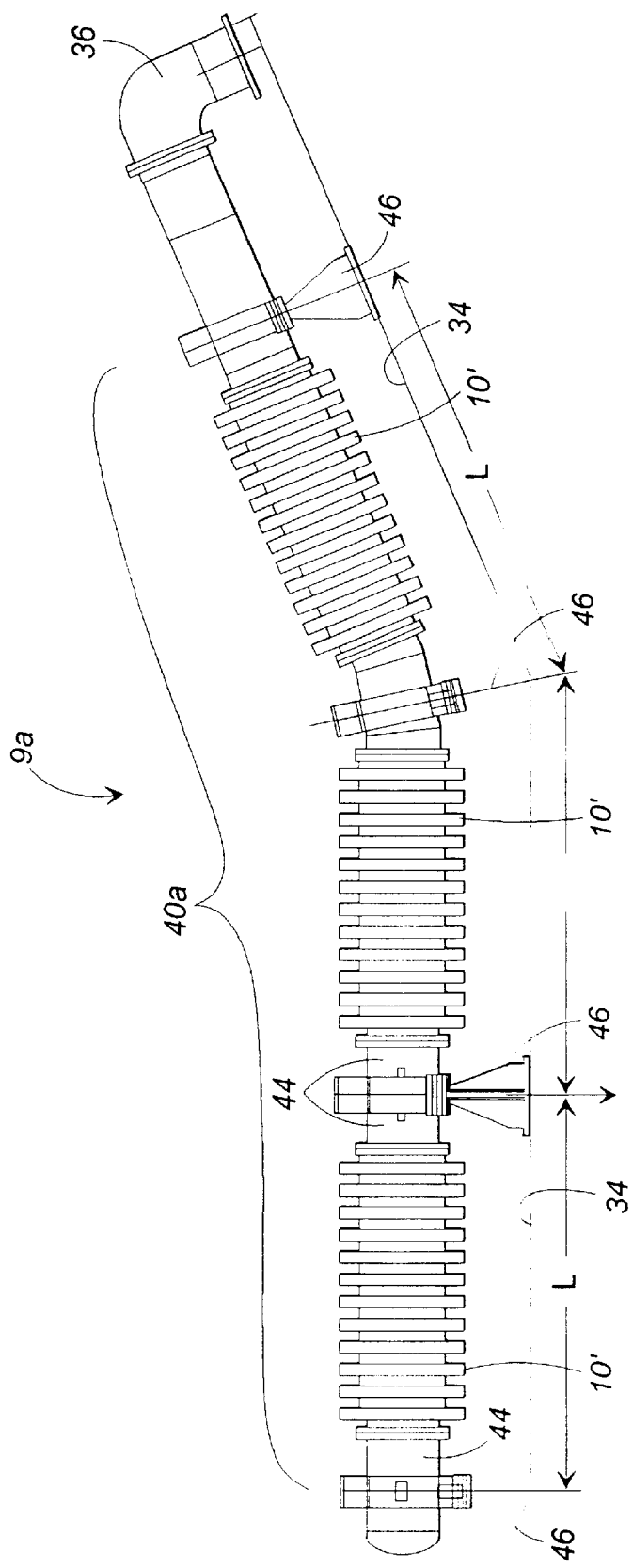

SUCTION SYSTEM WITH END SUPPORTED INTERNAL CORE TUBE SUCTION STRAINERS

CROSS REFERENCE

This application claims the benefit of U.S. Provisional Patent Application Ser. No. 60/038,107, filed Feb, 19, 1997, and of U.S. Provisional Patent Application Ser. No. 60/067,931, filed Dec. 9, 1997.

FIELD OF THE INVENTION

The present invention relates generally to the field of fluid recirculation systems incorporating suction strainers. More particularly, the present invention relates to internal core tube suction strainers for use with Emergency Core Cooling Systems of nuclear power plants.

BACKGROUND OF THE INVENTION

A critical function of Emergency Core Cooling Systems (ECCS) and other recirculation systems of nuclear power plants is to move fluids quickly and in large volumes to critical areas of the nuclear power plant in the event of accidents and emergencies. Integral to this critical function is the ability of strainers, filters, screens and other such devices associated with the systems to remove solids from the moving fluids while at the same time maintaining a sufficiently large volume of fluid flow.

Suction strainers are used in suppression pools of Boiling Water Reactor (BWR) nuclear power plants to remove solids from the fluid stored in the suppression pools when the fluid is drawn into an Emergency Core Cooling System (ECCS) or other recirculation system. The goal is to have strained fluid substantially free from particulate matter, thereby minimizing pump degradation.

In the United States and other countries, there are generally three different types of BWR nuclear power plants. The most common of these is the Mark I, followed by the Mark II and finally the Mark III. Each type of BWR nuclear power plant has a different suppression pool design. Generally speaking, the Mark I has a toroidal-shaped suppression pool, the Mark II has a simple circular tank, and the Mark III can best be described as a moat around the power plant. The differences in suppression pool design, as well as other plant design differences, have made the construction of a universally adaptable suction strainer unfeasible. Moreover, retrofitting upgraded suction strainers in existing BWR nuclear power plants is an extremely difficult task.

A universal goal in the nuclear power plant field has been to increase the effective surface area of suction strainers so that the required volumetric flow rate of water can be delivered to the reactor following a loss of coolant accident (LOCA). A LOCA can result when a high pressure pipe ruptures with such great force that large quantities of debris from thermal insulation, coatings, concrete, and other sources can wash into the suppression pool, thereby clogging the suction strainer(s). As a result, the volumetric flow rate of cooling water delivered to the reactor can be drastically reduced which, in turn, can lead to reactor core overheating. The thrust of recent advancements in the suction strainer art has been directed toward designing suction strainers that can adequately filter such debris from the suppression pool fluid without becoming clogged (i.e., without leading to a reduction in ECCS pump volumetric flow rate). Following a LOCA, it is critical that the ECCS pumps can operate undegraded for extended periods of time. To achieve this result, large quantities of fluid, free from solids and other particulate matter, must reach the pumps. Recent advances have yielded suction strainers that can adequately filter debris from the fluid to limit pump degradation, but the goal of increasing the surface area of suction strainers so that greater volumes of water can be delivered to the reactor has been more difficult to achieve in some BWR plants. This is due to the second effect of a LOCA.

The second effect of a LOCA in a BWR plant is the generation of post-LOCA hydrodynamic forces. Following a LOCA, high pressure steam is expelled from the reactor through structures known as downcomers which extend into the suppression pool. The resulting hydrodynamic forces created within the suppression pool place extreme loads upon any protruding structure within the pool, including suction strainers. While one function of the suppression pool is to condense this steam and thereby quickly dissipate these high pressures, significant hydrodynamic forces are still applied to the structural features and protrusions within the pool. In general, the greater the length and diameter of the suction strainer, the greater the resulting load on the strainer. For this reason, while it is easy to design a suction strainer having an increased surface area by increasing the overall length and diameter of the suction strainer, it is difficult to support such a strainer and, in many cases, to install such a strainer.

Heretofore, various suction strainers have been employed for the general objective of filtering solids from the fluid stored within a suppression pool of a BWR nuclear power plant. One such suction strainer design is the cantilevered suction strainer. Such suction strainers typically extend into the suppression pool, are connected to the ECCS suction pipe at one of its ends, and simply cantilever off that suction pipe end. That is the only means of support. Due to the extreme loads which result from post-LOCA hydrodynamic forces and the limited load carrying capabilities of the ECCS pipe and pipe penetration (that portion of the suppression pool wall adapted to receive the ECCS pipe to place the ECCS pipe in fluid communication with the suppression pool), the overall length and diameter of the cantilevered suction strainer is limited. For a given strainer diameter, if the cantilevered suction strainer is too long, the torque applied to the suction strainer by the post-LOCA hydrodynamic forces can damage the suction pipe to which it is attached and/or the penetration through the suppression pool wall.

An advancement in cantilevered suction strainer design is disclosed in U.S. Pat. No. 5,696,801. The suction strainer disclosed in this Application includes a filtering surface defined by a filtering structure that is attached to and built around an internal core tube. Reinforcing structural members extend outward radially from the internal core tube and provide support for the filtering structure. The external filtering structure is formed from a plurality of perforated plate assemblies positioned adjacent one another along the length of the core tube. The plate assemblies extend radially at alternating distances from the internal core tube thereby forming alternating protrusions and troughs. In this way, the surface area of the filtering surface is increased without increasing the overall length of the filtering structure. Openings in the internal core tube allow water from the suppression pool to be drawn through the filtering structure through perforations in the filtering surface. This configuration promotes controlled fluid in-flow along the suction strainer and substantially precludes the establishment of non-uniform localized entrance velocities through the filtering surface. The unique configuration of the external filtering structure enlarges the filtering surface area while minimizing the projected area of the suction strainer. Thus, more water can be drawn through this cantilevered suction strainer without increasing the overall distance this suction strainer extends into the suppression pool. While the overall filtering surface area of cantilevered suction strainers can now be increased, for a given strainer diameter, such suction strainers are still hampered by length limitations.

Other advancements in the art have been made by Sulzer Thermtec. Sulzer Thermtec has designed an elongated simple cylindrical strainer that appears to use a rib-type cage to support a perforated plate. The perforated plate performs the straining function while the cage provides structural support for the plate. The strainer extends parallel to and along the wall of the suppression pool and is connected at one end to the suction pipe with a 90° tee. There is no internal core tube. In order to withstand the extreme forces in the pool, the strainer is secured to the suppression pool wall at each of its ribs. Legs extending from each rib are apparently bolted or otherwise attached to the walls of the suppression pool. Again, installation can be time consuming and difficult, particularly if the suppression pool cannot be drained and if welding is required for strainer installation. Also, most BWR plants cannot accommodate a strainer diameter larger than 3 or 4 feet.

While the suction strainers described above remove solids from the fluid stored within the suppression pools of BWR nuclear power plants, it appears that neither is capable of handling the LOCA generated debris, being installed within geometrically limited diameters, and being supported adequately.

What is needed, therefore, but seemingly unavailable in the art, is a suction system that can (1) handle the postulated debris quantities, (2) be adequately supported and withstand LOCA generated forces, and (3) be installed without modifying the shell in the suppression pools of BWR nuclear power plants.

Unlike a BWR nuclear power plant, a Pressure Water Reactor (PWR) nuclear power plant does not utilize a suppression pool. Rather, a PWR nuclear power plant, both light water and heavy water types, has a containment area which remains dry until an accident occurs. In conventional PWR nuclear power plants, an accident results in the containment area being partially flooded with water and the ECCS relying on a sump pump to circulate the water through the reactor. Typically, the water is filtered through a structurally protective trash rack and then through a finer debris screen to separate particulate matter from the water passed through the ECCS. The suction strainer of the type utilized in a BWR nuclear power plant is not typically found connected to a PWR's ECCS suction piping. Typically, the volume and rate of fluid (e.g., water) flow recirculating through the ECCS is dependent upon the size of the sump pit as well as the overall size of the inlet orifice and related trash rack and debris screen. Accordingly, the volumes and rates of fluid flow in a prior art PWR nuclear power plant were limited by the structural limitations of these sump structures and fixtures. What is needed, therefore, is a manner of retrofitting PWR nuclear plants to overcome the surface area limitations of configurations already existing and, thereby, maintain rates of fluid flow through the ECCS that is encumbered by LOCA generated debris.

SUMMARY OF THE INVENTION

Briefly described, the present invention comprises an improved suction system including, in the genus, a suction strainer and suction pipe assembly mounted to fluid delivery piping of an ECCS of a nuclear power plant or other such fluid delivery system, with the suction strainer being supported between two opposing ends, and in its species a plurality of alternate embodiments of end mounted suction strainers and suction pipe assemblies mounted to BWR suppression pool wall(s) or PWR containment area sumps through various support combinations. The present invention provides an improved suction strainer for use, in its preferred embodiments, in the suppression pools and/or containment areas of nuclear power plants which overcomes the design deficiencies of other suction strainers known in the art. While the discussion of the improved suction strainer and the suction system of this invention focuses heavily on its use and value in connection with BWR nuclear power plants, alternate embodiments of the strainer also have utility when employed with Pressurized Water Reactor (PWR) nuclear power plants of both the light water and heavy water type. Furthermore, it will be understood from these descriptions that the invention will find application in connection with nuclear reactor plants other than BWR and PWR plants, and in connection with other facilities having comparable fluid delivery systems. The suction system of this invention provides an inventive improvement to that suction strainer disclosed in U.S. Pat. No. 5,696,801, which patent is incorporated herein by this reference. The result is a novel method and apparatus for filtering solids and other particulate matter from the fluid (e.g. water) used in the emergency core cooling systems of nuclear power plants and other recirculation systems.

The elongated suction strainer of the suction system of the present invention can be used to maintain design volumetric flow capacity through an Emergency Core Cooling System (ECCS) encumbered with LOCA generated debris, and other similarly encumbered recirculation systems. Several ECCS pumps can be connected to the same suction strainer via multiple suction pipes. If one pump fails, the other pumps will continue to draw fluid through a common suction strainer.

The present suction system is also designed to be adaptable for use within the suppression pool of any type of existing BWR nuclear power plant, either the Mark I, Mark II or Mark III. Moreover, the suction system of the present invention can easily be adapted for use in other suppression pools for BWR nuclear power plants not yet designed. Alternate embodiments of the suction system of this invention are employable for use with both light water and heavy water pressurized water reactor (PWR) nuclear power plants, typically as part of a larger assembly/system which includes additional piping attached to and projecting from the sunken drain of the PWR. The flexibility of the present system will be further described in greater detail hereafter.

These and other advantages which will be discussed more fully below, are attainable due to the novel construction of the suction system of the present invention. The suction strainer of the system is connected to the suction pipe of a recirculation system and removes solids from the fluid from, for example, a suppression pool of a BWR nuclear power plant. The strainer is constructed with an internal hollow core tube and an exterior filtering structure. The internal core tube is formed from a core wall which bounds a hollow core chamber. A plurality of fluid inlets spaced along the core wall place the chamber and suppression pool in fluid communication with each other. The exterior filtering structure is connected to and at least partially bounds the core wall and has a number of very small perforations passing therethrough. The filtering structure is further constructed from a plurality of plate assemblies spaced sequentially along and surrounding the core wall. When ECCS pumps in the recirculation system are activated, fluid from the suppression pool is drawn through the perforations in the exterior filtering structure, then through the fluid inlets in the core wall, and finally, into the core chamber. The strained fluid is then, for example, drawn through the suction pipe to the pump where it is either sprayed onto the reactor core and/or simply recirculated through a closed loop cooling system. The details regarding the structure of the suction strainer as hereinabove described are more fully set forth in U.S. Pat. No. 5,696,801, which has been incorporated herein by reference. This suction strainer structure is applicable to all of the embodiments of the suction system of this invention which will be described in more detail below.

The core tube of the present invention has at least two functions. First, it acts as a suction flow control apparatus once fluid from, for example, the suppression pool or containment area has passed through the perforations in the exterior filtering structure. Second, and more pertinent with respect to the novelty of the present invention, the core tube is the primary structural support for the suction strainer of the present invention. Because of the rigidity of the core tube, the suction strainer can be constructed so that when the suction strainer is supported only at its two ends, it spans a length significantly longer than any other suction strainer known in the art.

The suction strainer can be a unitary structure or it can be formed from several sections connected end-to-end in series along a common longitudinal axis. Regardless of how the suction strainer is formed, an elongated suction strainer results. When several suction strainer sections are used to create the elongated suction strainer, the adjacent ends of the suction strainer sections can be connected in several ways. In one embodiment of the present invention, each end of the core tube has a truncated core extension depending therefrom. The core tube extensions are, preferably, equipped with a typical pipe flange on the extension end that is remote from the core tube. Each flange is sized and shaped to abut the flange of an adjacent suction strainer core tube extension to facilitate connection of the suction strainer sections. Typically, the core tube extensions protrude away from the strainer plate assemblies a distance sufficient to permit connection of the flanges between the opposed plate assemblies of adjacent suction strainer sections. The flanges can be connected by welding or with any number of suitable devices such as, but not limited to, clamps, brackets, sleeves, bolts, or other fastening mechanisms.

The flanges are also sized and shaped to be attached to flanges depending from the end of the suction pipe of the piping system of a BWR nuclear power plant or the ECCS pipe penetration in the suppression pool wall. The flange connections at the suction pipe are made in the same manner as other flange connections between suction strainer sections. When a suction pipe is connected to each end of the elongated suction strainer, the core tube provides support for the entire weight of the elongated suction strainer. When the elongated suction strainer is supported in this manner, the suction pipes and ECCS pipe penetration should be reinforced so that they can withstand the loads which will result from post-LOCA hydrodynamic forces.

The flanges attached to the core tube extensions at the ends of the elongated suction strainer can also be secured to a cap that prevents access to the core chamber. These end caps are then fastened to existing structural supports within the suppression pool so that the loads from post-LOCA hydrodynamic forces are transferred from the strainer sections, through the structural supports, and to the suppression pool supports rather than directly to the suction pipes or their penetrations. When the elongated suction strainer is supported at both of its ends in this manner, the suction pipe connections can be made anywhere between the end caps. Generally speaking, the type of BWR/PWR nuclear power plant, the suppression pool (or containment area and sump pit) geometry and the ECCS pipe configuration will dictate how the suction pipe connections are made, the maximum length of the strainer sections used and the maximum length of the resulting elongated suction strainer employed. In certain BWR nuclear power plant suppression pools, the suction pipes are connected to a pipe fitting, such as an elbow or tee, located between an end of the elongated suction strainer and the structural support within the pool.

In an alternate embodiment of the present invention the suction strainer sections are formed with flangeless core tube extensions. The suction strainer sections are aligned end-to-end along a common axis so that the core tube extensions of adjacent suction strainer sections are directly in line with and in contact with each other. The core tube extensions are then connected together with welds, brackets, clamps or other fastening devices. The suction pipe connections are then made in the same manner as described above with respect to the first embodiment of the present invention; the one difference being that the core tube extensions at the ends of the elongated suction strainer may not have flanges. Thus, these suction pipe connections will also be made using welds, brackets, clamps or other fastening devices.

In another embodiment of the suction system of the present invention, the suction pipe connections to the elongated suction strainer are made at a 90° angle with respect to the longitudinal axis extending through the internal core tube. To make this connection, a weld-o-let T-connection is used. The weld-o-let T-connection preferably has a core tube portion and a suction pipe portion. The core tube portion has a core wall surface that defines a bore therethrough. A plurality of apertures are spaced along a portion of the core wall surface. That portion of the core wall surface having apertures therethrough is bounded by a plurality of partial plate assemblies spaced sequentially along and eccentrically mounted on the core tube portion of the weld-o-let T-connection. The suction pipe portion includes a solid suction wall surface which forms the leg of the weld-o-let T-connection. The suction wall surface defines a channel for connecting the bore to the suction pipe. Typically, the suction pipe portion extends from the non-perforated area of the core wall surface.

As a result of this novel weld-o-let T-connection arrangement, the T-connection is a part of the suction system. This novel arrangement allows for an increase in the suction strainer surface area while providing additional suction pipe connections to the elongated suction strainer. Because the weld-o-let T-connections are a part of the suction system, the suction pipe connections can be staggered along the entire length of the elongated suction strainer. The core tube portion of the T-connections provide additional support to the elongated suction strainer, thus the elongated suction strainer can be made even longer. Another advantage of this arrangement is that a number of suction pumps, can be connected to the same suction strainer using separate suction pipe connections. Thus, if one pump falters, the effect on the recirculation system is minimal.

While the preceding disclosure focuses primarily on elongated suction strainers constructed from a plurality of suction strainer sections, a single elongated suction strainer, supported at its ends, is a viable alternative due to the structural support provided by the internal core tube. However, forming the elongated suction strainer from a plurality of suction strainer sections provides a number of practical advantages.

First, because existing nuclear power plants are to be retrofitted with the suction system of the present invention, it will be more practical to install the system using a number of smaller suction strainer sections. Moreover, because there are different types of ECCS for different BWR/PWR nuclear power plants, using several suction strainer sections will provide more design options. Additionally, it is easier to transport suction strainer sections rather than a single elongated suction strainer. Thus, the costs associated with transportation and installation are reduced. Also, standardized castings can be used to create standard size suction strainer sections.

These and other objects, features and advantages of the present invention will be more readily apparent from the following detailed description, read in conjunction with the accompanying drawings.

BRIEF DESCRIPTION OF THE DRAWINGS

FIGS. 9–13 are side elevational views of exemplary, alternate embodiments of the suction system of the present invention;

DETAILED DESCRIPTION OF THE PREFERRED EMBODIMENTS

Figure 1:
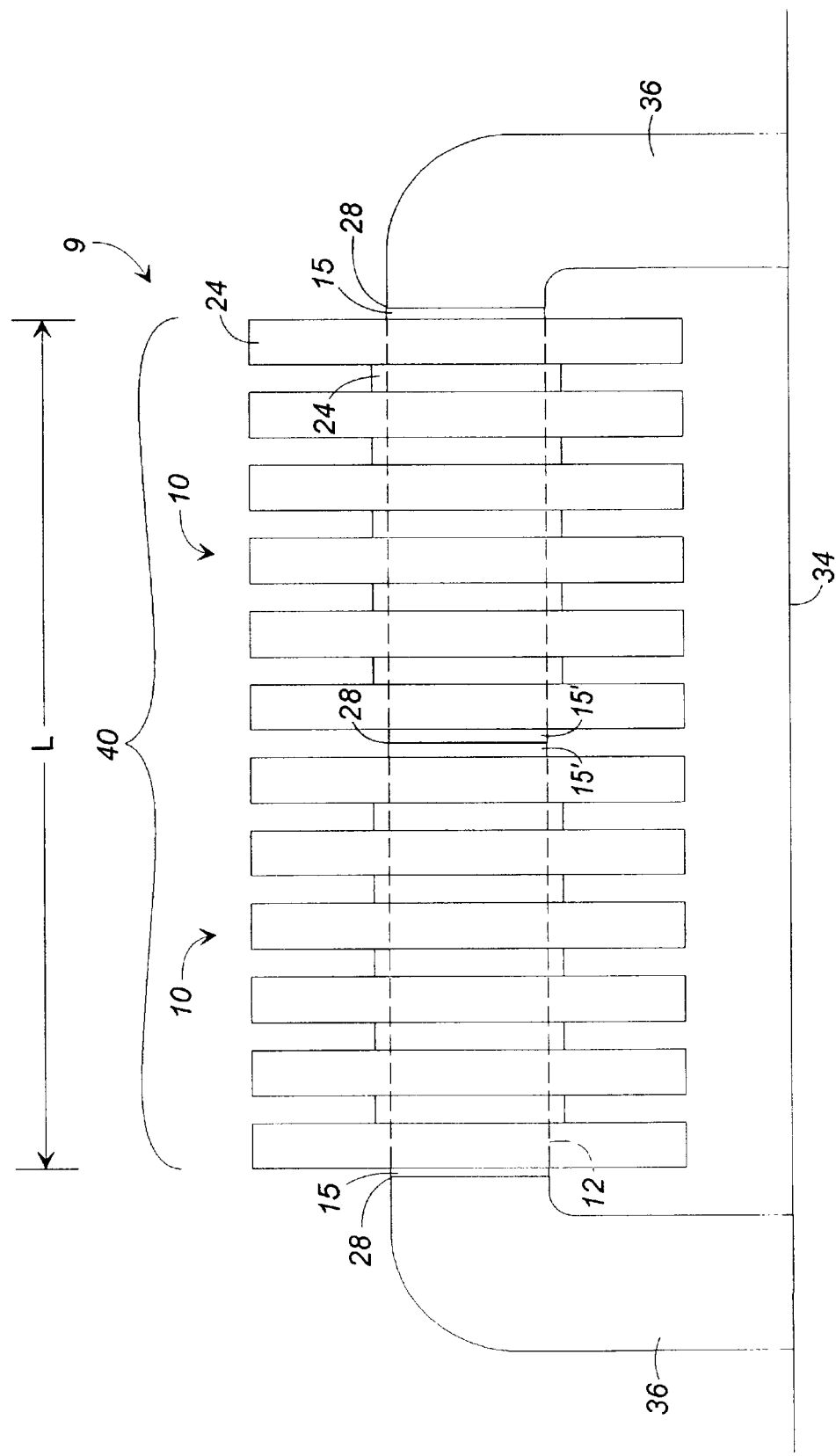
FIG. 1 is a side elevational view of a first embodiment of the suction system of the present invention, shown within the suppression pool of a BWR nuclear power plant.
Figure 2A:
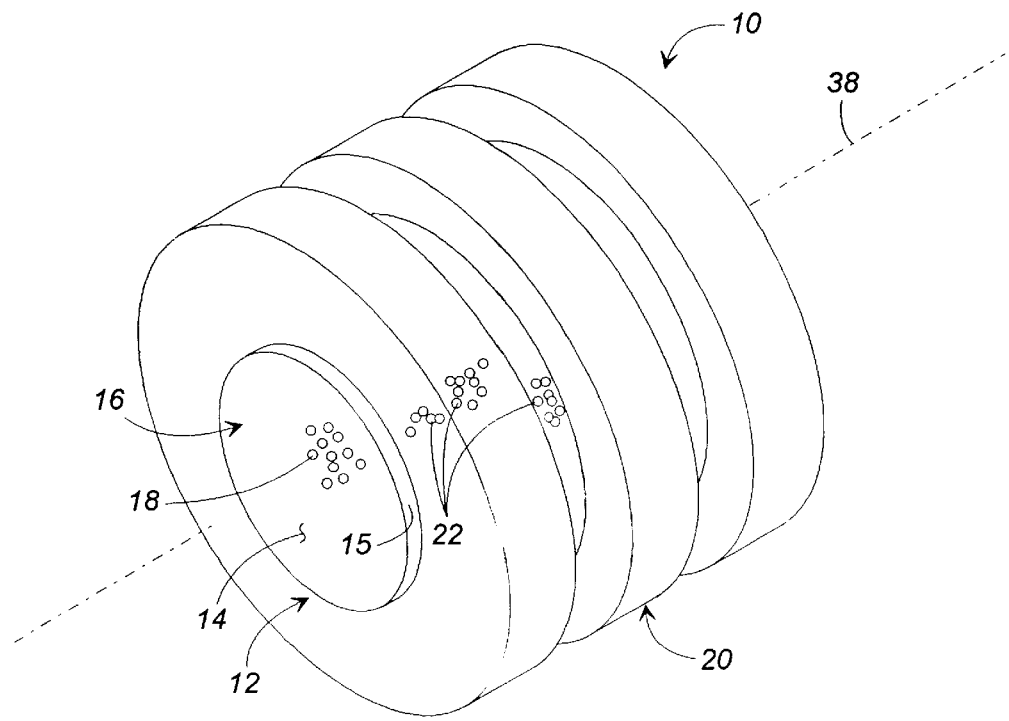
FIG. 2A is a perspective view of a first embodiment of a suction strainer section of the suction system of FIG. 1.

Referring now to the drawings, in which like reference characters indicate like parts throughout the several views, FIG. 1 illustrates a suction system 9 in accordance with a first preferred embodiment of the present invention. The suction system 9 includes an elongated suction strainer 40 formed by connecting two suction strainer sections 10 end-to-end in series, and includes system suction piping 36 to which the strainer 40 is connected. FIG. 2A illustrates a first preferred embodiment of the suction strainer section 10 of the present invention. However, because of the number of different types of BWR and PWR nuclear power plants, and therefore the number of different suppression pool and/or containment area configurations, it is to be understood that no one elongated suction strainer 40, 40', 40", or 40'" and no one suction strainer section 10 or 10' can be said to be the preferred embodiment. For this reason, the present invention will be described by referring to several preferred embodiments.

Reference numeral 10 of the various Figs. illustrates a first embodiment of a suction strainer section of the present invention. As seen most clearly in FIG. 2A, the suction strainer section 10 extends along a longitudinal axis 38 and comprises an internal core tube 12 and an exterior filtering structure 20. The internal core tube 12 includes a core wall 14 that defines a generally cylindrical core chamber 16. The core wall further includes a plurality of fluid inlets 18 which provide access to the core chamber 16 from the exterior filtering structure 20. The exterior filtering structure 20 is attached to and encircles the entire length of the core wall 14. A plurality of perforations 22 spaced throughout the exterior filtering structure 20 permit water from a fluid reservoir (for example, stored within the suppression pool of a BWR nuclear power plant) to pass through the exterior filtering structure 20, and together with the fluid inlets 18, place the fluid reservoir in fluid communication with the core chamber 16. The perforations 22 are sized and spaced so as to allow the passage of water and other fluids while preventing the passage of solids and other particulate matter.

Figure 2B:
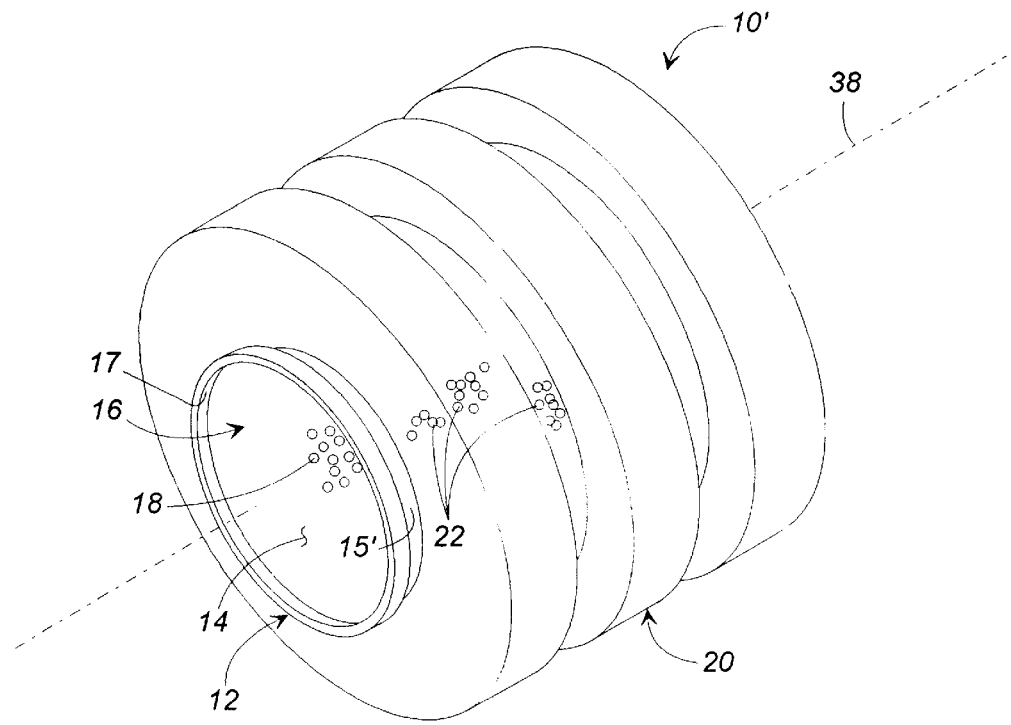
FIG. 2B is a perspective view of a second embodiment of a suction strainer section of the present invention.

The suction strainer section 10 of FIG. 2A further comprises a core tube extension 15 extending from each end of the internal core tube 12. FIG. 2B shows a second preferred embodiment of a suction strainer section 10'. The core tube extension 15' of this section 10' includes a flange 17 which will be described more fully below. The core tube extensions 15 and 15' are not encircled by the exterior filtering structure 20, thus the core tube extensions 15 and 15' are solid structures and facilitate the connection of one suction strainer section 10 or 10', to another suction strainer section 10 or 10', respectively. The core tube extensions are also adapted for connection to other structures, as well.

As shown in FIGS. 2A, 2B, only a portion of the perforations 22 are depicted in the exterior filtering structure 20. Likewise, only a portion of the fluid inlets 18 are depicted in the core wall 14. In both instances, this is done in an effort to clarify the view. The perforations 22 and fluid inlets 18 are actually spaced throughout the entire surface areas of the exterior filtering structure 20 and core wall 14, respectively, as described in detail in U.S. Pat. No. 5,696,801, which has been incorporated herein by reference.

Figure 3:
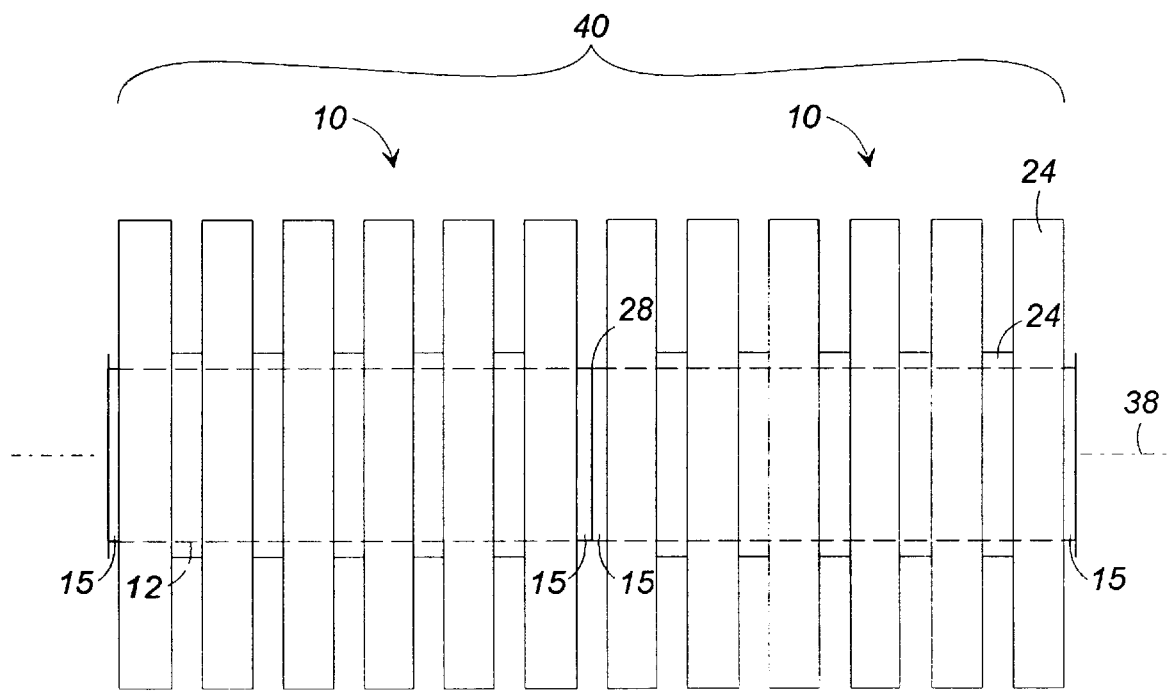
FIG. 3 is a side elevational view of a pair of the elongated suction strainer sections of FIG. 2A shown connected end-to-end.
Figure 4:
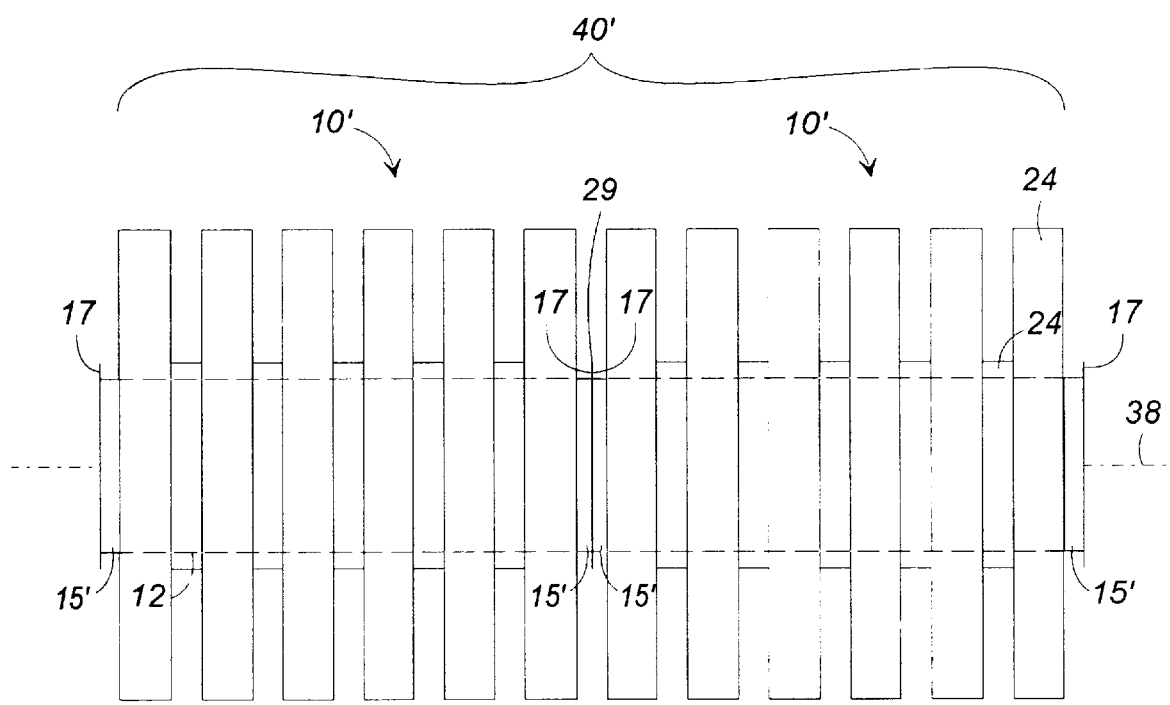
FIG. 4 is a side elevational view of a pair of the elongated suction strainer sections of FIG. 2B shown connected end-to-end.

As seen more clearly in FIGS. 1, 3 and 4, the exterior filtering structure 20 includes a plurality of concentric plate assemblies 24 spaced sequentially along the length of the core tube 12.

As shown in FIG. 3, the suction strainer sections 10 (of FIG. 2A) are aligned in series along a common longitudinal axis 38 and connected to form a first embodiment of an elongated suction strainer 40 used in the suction system 9 of the present invention. The core tube extensions 15 are aligned end to end and welded together at the connection point 28. It is to be understood that a clamp or other fastening device can be used to make this connection.

FIG. 4 shows a pair of suction strainer sections 10' (of FIG. 2B) aligned and connected in series along a common longitudinal axis 38 to form a second embodiment of an elongated suction strainer 40'. The suction strainer sections 10' of FIG. 4 differ from the suction strainer sections 10 of FIG. 3 in that the core tube extensions 15' of FIG. 4 include flanges 17. Thus, as shown in FIG. 4, adjacent flanges 17 of adjacent core tube extensions 15' are aligned along a connection point 29 to facilitate connection of the suction strainer sections 10'. The adjacent flanges 17 are typically bolted together to form the elongated suction strainer 40', but they can be welded or attached by use of other mechanisms commonly known in the art. A seal (not shown) is, alternately, provided between the flanges 17 to prevent fluid from entering the core tube at the connection point 29; however, such a seal is not required.

In FIG. 1, the elongated suction strainer 40 is shown supported at its ends by the suction pipe 36 of the suction system 9. This configuration represents a first preferred embodiment of the suction system of the present invention. The suction pipe 36 extends through the reservoir wall 34 (for example, the suppression pool wall of a BWR nuclear power plant), and is welded to the core tube extensions 15 remote from the connection point 28. In this embodiment, the elongated suction strainer 40 is suspended at its ends within the water of the suppression pool. Due to the tensile strength of the internal core tube 12, the elongated suction strainer 40 can withstand the hydrodynamic forces following a LOCA while supported in this manner. The length of the elongated suction strainer 40 of this embodiment is limited only by the load limits of the suction pipe 36 supporting the system 9 and the dimensions and construction of the suppression pool itself.

Figure 5:
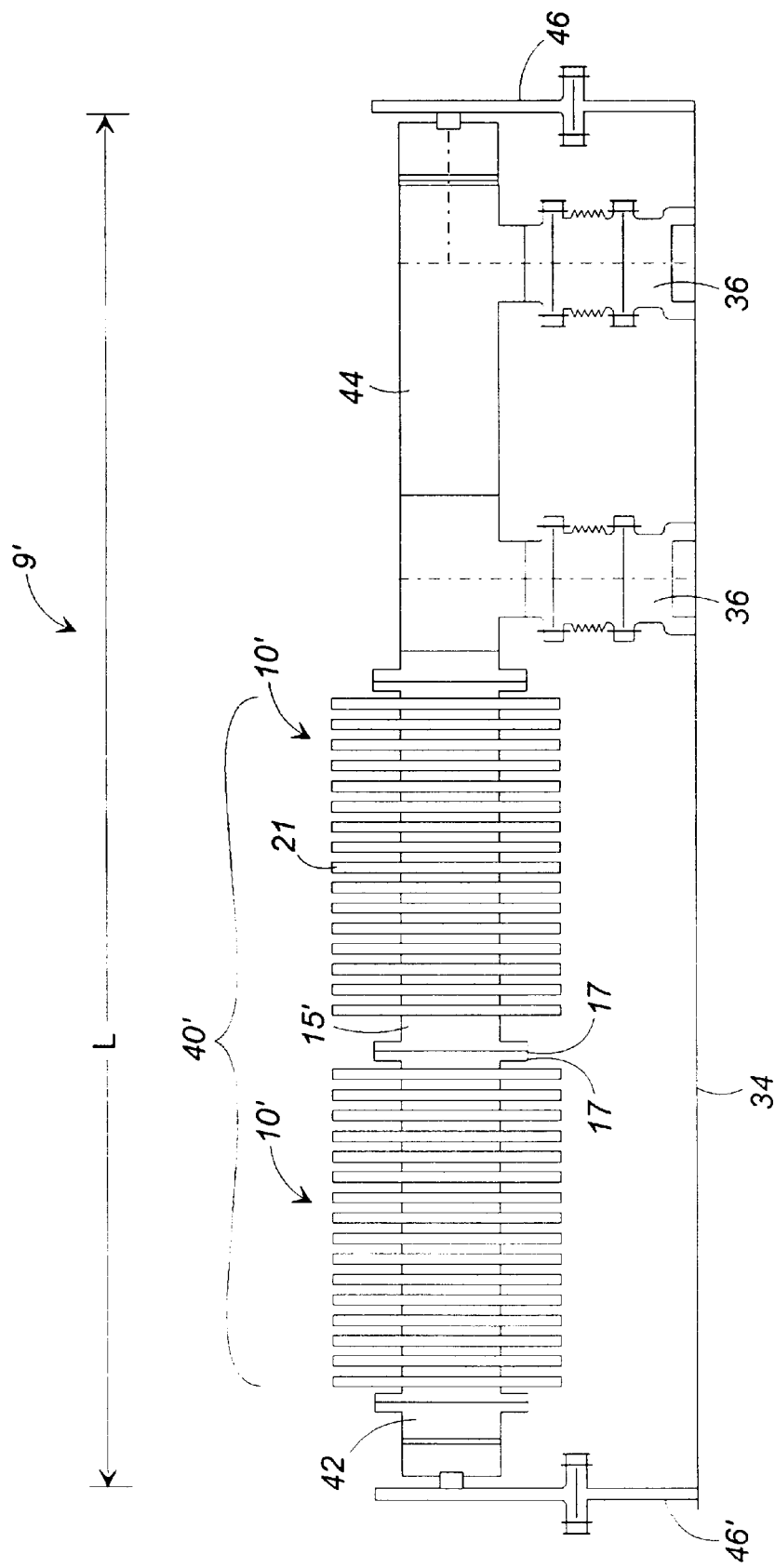
FIG. 5 is a plan view of a second embodiment of the suction system of the present invention, showing an elongated suction strainer of the present invention supported at its ends by ring girders.

In FIG. 5, a second embodiment of the suction system 9' of the present invention is shown. In this embodiment, an elongated suction strainer 40' is formed by connecting the flanges 17 of the core tube extensions 15' of adjacent suction strainer sections 10' as described above with respect to FIG. 2B. One end of the elongated suction strainer 40' is then connected to an end cap 42, while the other end of the suction strainer 40' is connected to a pipe extension 44. As shown in FIG. 5, one end of the end cap 42 and one end of the pipe extension 44 are sized and shaped to be bolted or otherwise attached to the flange 17 of the core tube extension 15' on each end of the elongated suction strainer 40'. The other ends of the end cap 42 and pipe extension 44 are connected to structural members 46 extending into the pool from the wall 34 of, for example, the suppression pool of a BWR nuclear reactor. The suction pipe 36 of the suction system 9' extends through the wall 34 and is connected to the elongated suction strainer 40' by 90° connections in the pipe extension 44. While the suction strainer 40' of this embodiment of the suction system 9' is still supported at its ends, it is not supported at its ends by the suction pipe 36. Instead, it is supported at its ends by structural members 46 (known as ring girders) within the suppression pool. In this case, ring girders are the structural members 46 supporting the elongated suction strainer 40'. Their function is to transfer hydrodynamic forces applied to the elongated suction strainer 40' as a result of a LOCA, to the suppression pool wall 34. This minimizes or prevents the transfer of hydrodynamic loads to the suction pipe 36. An elongated suction strainer 40' having increased length results.

Figure 6:
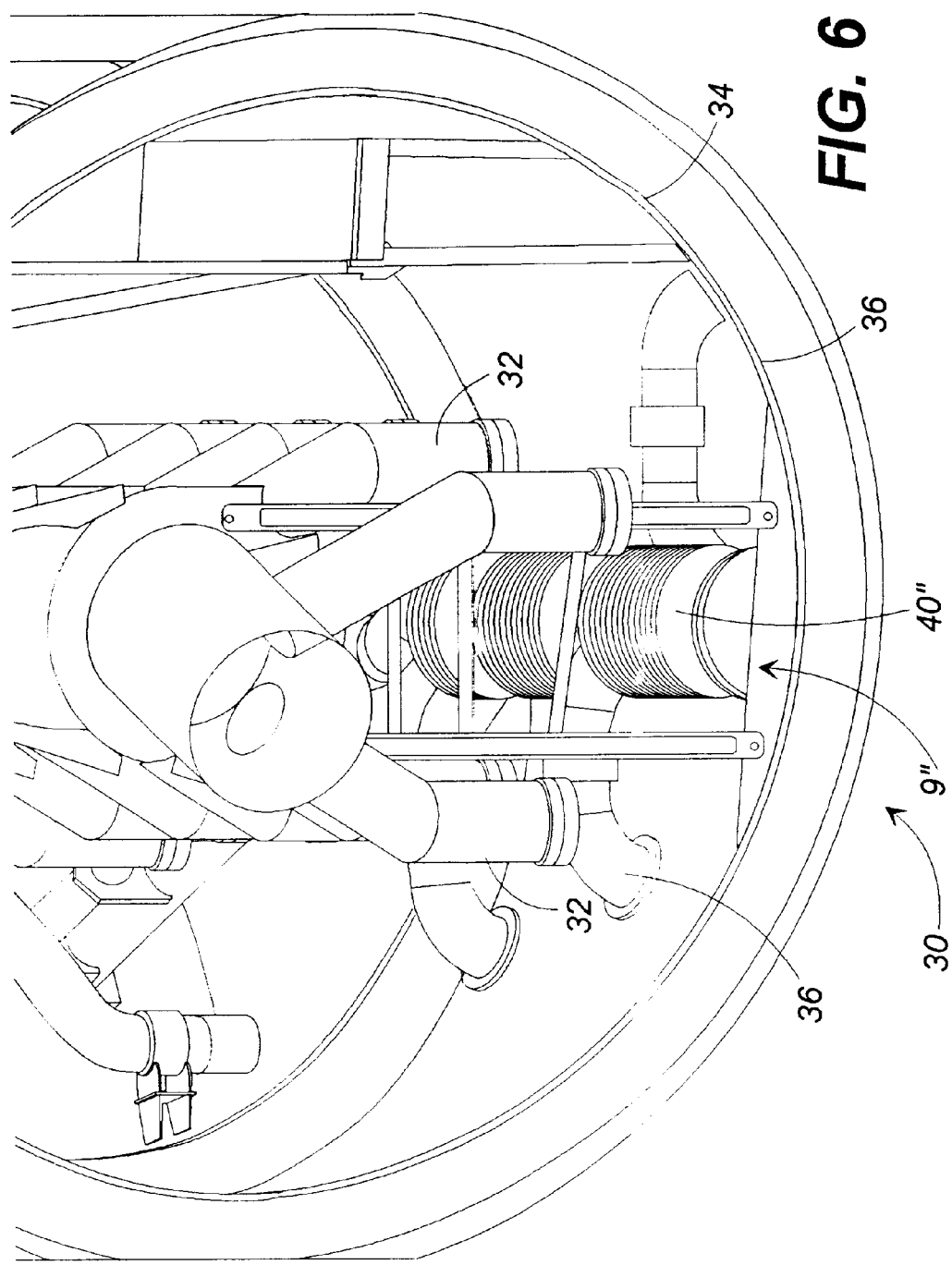
FIG. 6 is a perspective view of a third embodiment of the suction system of the present invention taken through the cross-section of a toroidal-shaped suppression pool.

FIG. 6 shows a third embodiment of the suction system 9" of the present invention within a toroidal-shaped suppression pool 30 of a Mark I BWR nuclear power plant. FIG. 6 further shows the proximity of the downcomers 32 and elongated suction strainer 40". During a LOCA, high pressure steam is discharged from the downcomers 32 toward the elongated suction strainer 40". The hydrodynamic forces resulting from the super-turbulent water caused by this discharge is delivered to the elongated suction strainer 40", the suction pipes 36, the suppression pool wall 34 and other structural members within the suppression pool 30.

Figure 7:
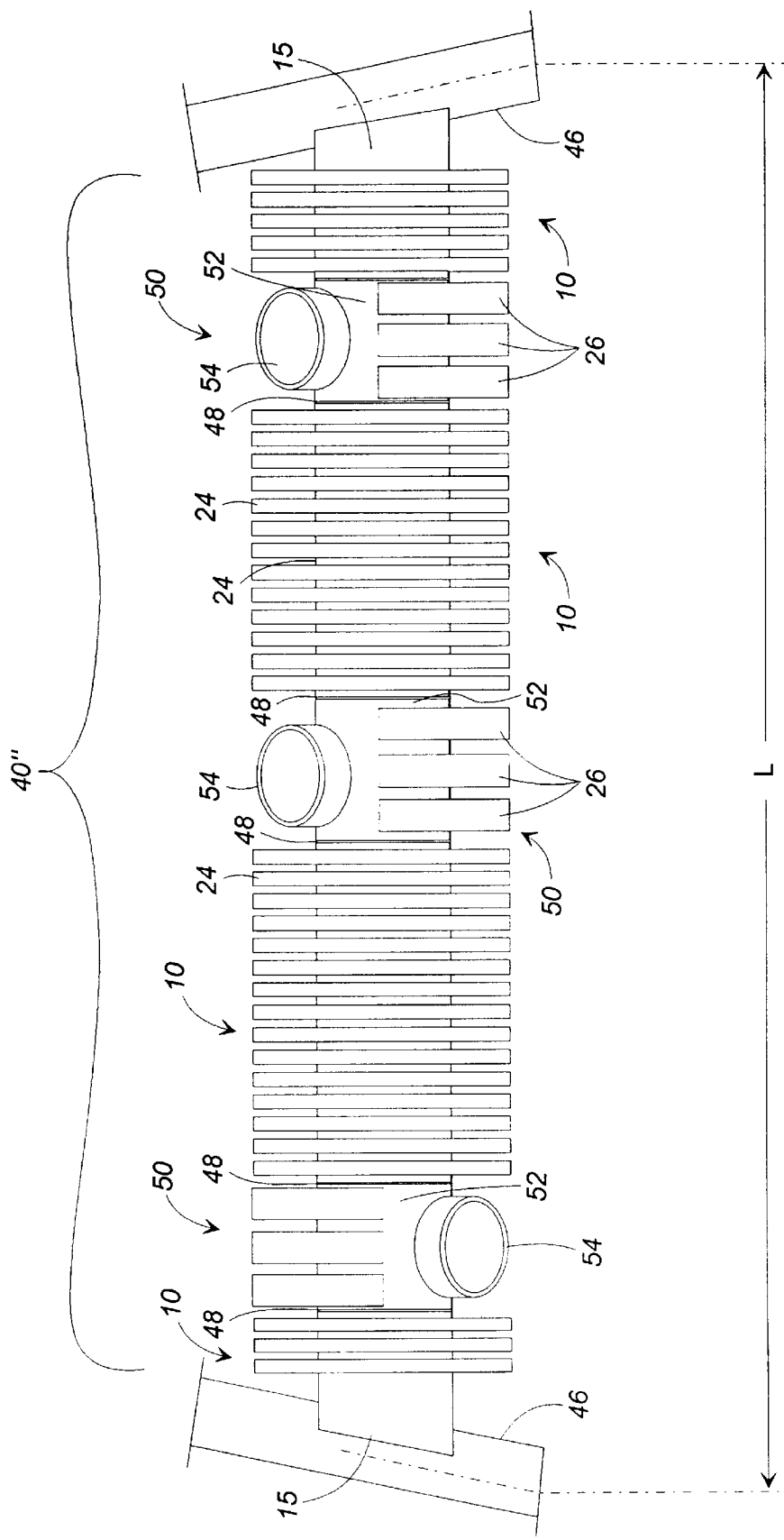
FIG. 7 is a side elevational view of the elongated suction strainer of the suction system of FIG. 6, which represents a third embodiment of the elongated suction strainer, shown supported at its ends by ring girders.

The elongated suction strainer 40" of FIG. 6 represents a third embodiment of the elongated strainer of the present invention and is shown in more detail in FIG. 7. In this embodiment, the elongated suction strainer 40" is supported at both ends by structural members 46. The ends of the elongated suction strainer 40" are shown welded to structural members 46, but other attachment methods are possible. In this embodiment, the elongated suction strainer 40" is again formed by aligning several suction strainer sections 10 end-to-end in series along a common axis. However, a T-connection 50 is placed between and aligned with each of the adjacent suction strainer sections 10 to facilitate connection of the elongated suction strainer 40" to the suction pipe 36.

Figure 8A:
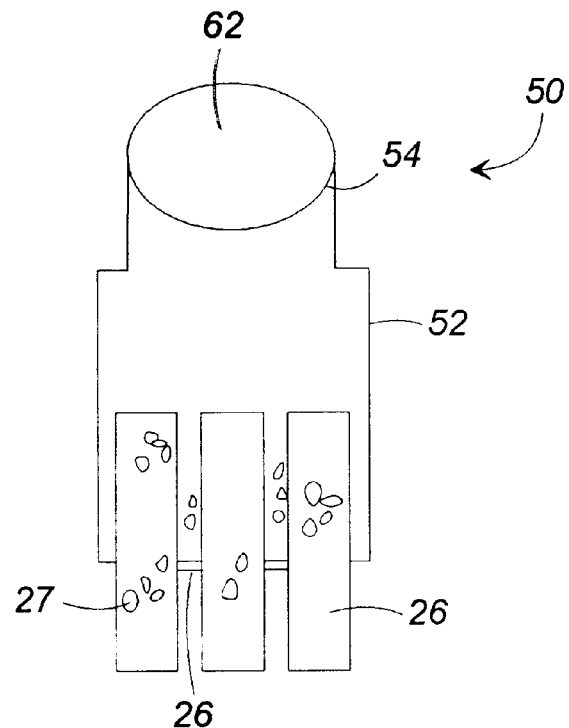
FIG. 8A is a side elevational view of a weld-o-let T-connection of the elongated suction strainer of FIG. 7.
Figure 8B:
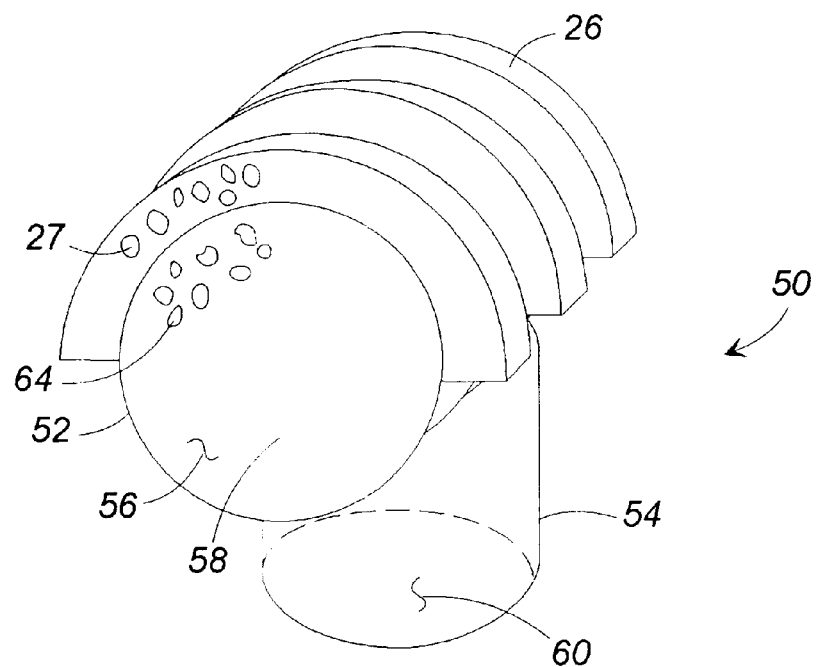
FIG. 8B is a perspective view of a weld-o-let T-connection of the elongated suction strainer of FIG. 7.

As shown in FIGS. 8A and 8B, each T-connection 50 has a core tube portion 52 and a suction pipe portion 54. The core tube portion 52 includes a core wall surface 56 defining a bore 58 therethrough. The suction pipe portion 54 includes a solid suction wall surface 60 defining a channel 62 that opens into the bore 58. The core wall surface 56 further includes a plurality of spaced apertures 64 along the portion of the surface opposite the suction pipe portion. A plurality of partial plate assemblies 26 are spaced sequentially along and eccentrically connected to that portion of the core wall surface 56 having the apertures 64 therethrough. The partial plate assemblies 26 include a plurality of spaced perforations 27 similar to the perforations 22 in the concentric plate assemblies 24 of the suction strainer sections 10 and 10' described above. Thus, what is formed is a T-connection 50 that acts as a suction strainer section. Only a portion of the apertures 64 and perforations 27 are shown in FIGS. 8A and 8B in an effort to clarify the view. The perforations 27 are actually spaced throughout the entire surface area of the partial plate assemblies 26, and the apertures 64 are actually spaced throughout the entire surface area of the core tube portion 52 bounded by the partial plate assemblies 26.

As seen in FIGS. 8A and 8B, the preferred embodiment of the T-connection 50 has apertures 64 along one-half or 180° of the core wall surface 56. Thus, for example, the partial plate assemblies 26 cover a corresponding 180° portion of the core wall surface 56. It is to be understood that the amount of core wall surface 56 having apertures 64 therethrough is purely a matter of design choice. Thus, the partial plate assemblies 26 could cover the entire core wall surface 56 with the exception of that portion of core wall surface 56 having the suction pipe portion 54 extending therefrom.

As seen in FIG. 7, the ends of the suction strainer sections 10 and T-connections 50 are aligned and welded along weld lines 48. The result is an elongated suction strainer 40" having multiple suction pipe portions 54 extending transversely along its length. Thus, several suction pipes 36 communicating with the nuclear power plant can be connected to and staggered along the length of one elongated suction strainer 40". Several ECCS pumps can thus be connected to the same elongated suction strainer 40".

With reference to all embodiments, the elongated suction strainer 40, 40', 40", 40''' and its associated extensions 15, caps 42 and pipe extensions 44 when occupying a supported position within the suppression pool suction system, 9, 9', 9", define, in accordance with the preferred embodiments of the present invention, a segment (of which there may be more than one in some embodiments) which will be referred to herein as the "spanning suction strainer segment" being that segment of the suction system which is supported at two displaced support members 46 and spans a considerable free-span length between the displaced support members. The spanning suction strainer segment (as well as the "free span length" thereof) is represented by the dimension "L" in FIGS. 1, 5 and 7 (and other Figs.).

The "free-span length" ("L") is a length of the suction system 9, 9', 9" that is not interrupted by a member which transfers weight or force to the walls 34 or other supporting structure. By virtue of the present invention, and in accordance with preferred embodiments thereof, suction strainer systems 9, 9', 9" within the unique environment of nuclear power plants define free span lengths ("L") in excess of seven (7) feet, and, more preferably, in excess of ten (10) feet. Spanning suction strainer segments of shorter lengths are within the scope of the present invention and the inventiveness of such smaller length strainers are themselves novel and unobvious both alone and as part of the overall suppression pool suction system 9, 9', 9", 9''' of the present invention. The maximum free-span length for a given embodiment is limited in practical application by factors such as the location of suppression pool structural supports, the shape of the suppression pool, the internal dimensions of the suppression pool, and the location of other structural members within the suppression pool. The ability of the elongated suction strainers 40–40''' to span the desired free-span length in a given installation is provided by the load bearing strength of the core tube 12. For example, for longer free-span lengths, the core tube 12, core tube extensions 15, and core tube portions 52 (for example in embodiments utilizing T-connections), and related pipe extensions 44 are constructed of stronger metals or thicker materials, or are reinforced with longitudinally extending ribs. By way of example, a free-span length is represented by the dimension L in FIG. 7. There, the T-connections 50 extend the overall length of the elongated suction strainer 40", but the connection of the suction pipe portions 54 to the ECCS pipe penetration (not shown) in the suppression pool wall does not transfer or support appreciable weight or force to the suppression pool wall. Thus, the free-span length (as defined herein) of the spanning suction strainer segment "L" is from support 46 to support 46.

Additional exemplary embodiments of suction systems (labeled 9a–9e) are depicted in FIGS. 9–13. FIG. 9 depicts an exemplary suction system 9a which includes an elongated suction strainer 40a comprised of three suction strainer sections 10' connected to one ECCS pipe penetration 36. Each of the strainer sections 10' is supported at its ends by ring girders 46 mounted to the reservoir wall 34. Each of the suction strainer sections 10' is itself "elongated" such that each defines a spanning suction strainer segment ("L"). In one example, and without limitation, the free-span length of each of these spanning suction strainer segments "L" of FIG. 9 is acceptably, approximately 150 inches.

Figure 10:
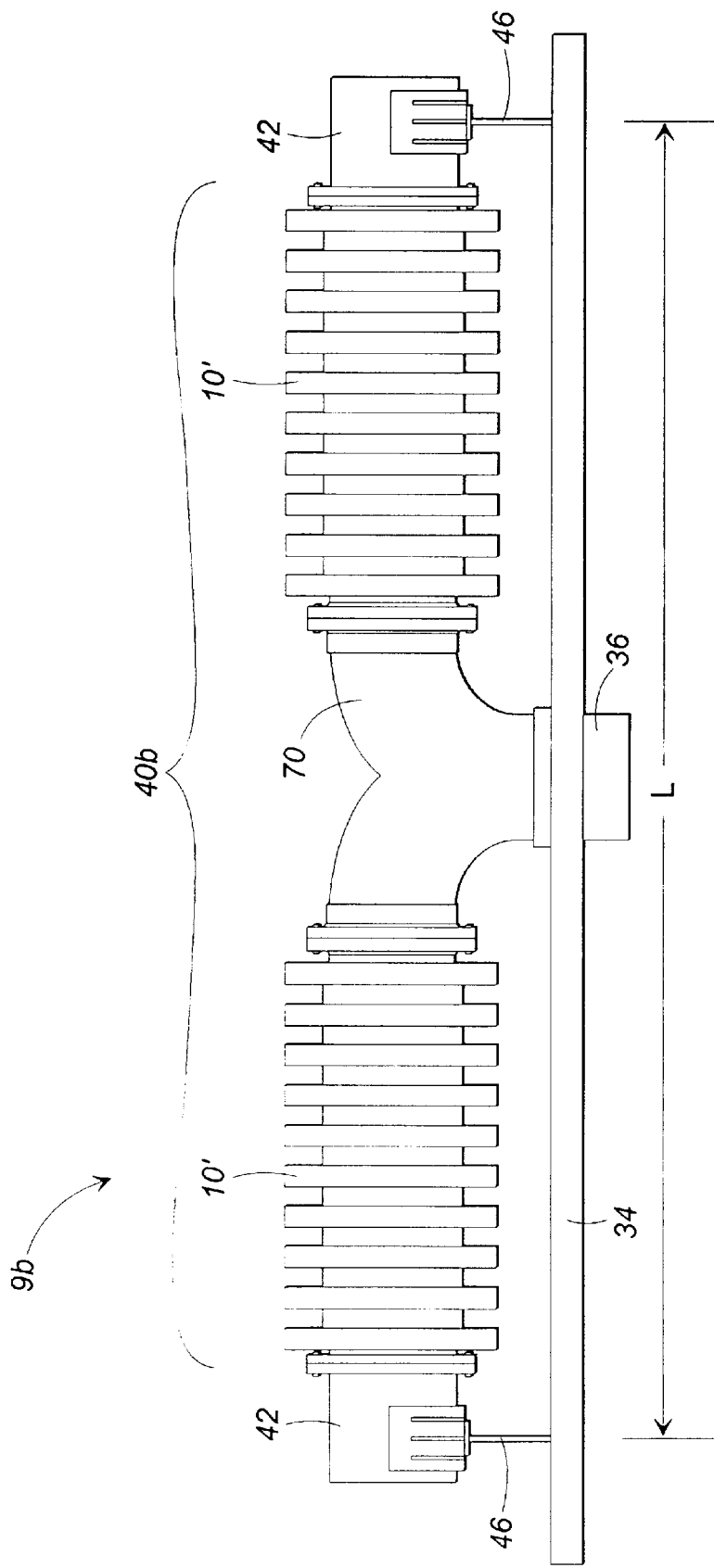

FIG. 10 depicts an exemplary suction system 9b which includes an elongated suction strainer 40b comprised of two identical suction strainer sections 10' symmetrically installed on each side of a "ram's head" tee 70, with the entire elongated suction strainer 40b supported at two ends by ring girders 46 connected to the reservoir wall 34. The ram's head tee 70 interconnects with the suction pipe 36 of the system through a "slip-fit connection" in a manner that does not transfer meaningful weight to the suction pipe. Thus, the spanning suction strainer segment "L" is that considerable length shown in the drawings. One example, without limitation, of an acceptable free-span length associated with this embodiment is approximately 210 inches.

Figure 11:
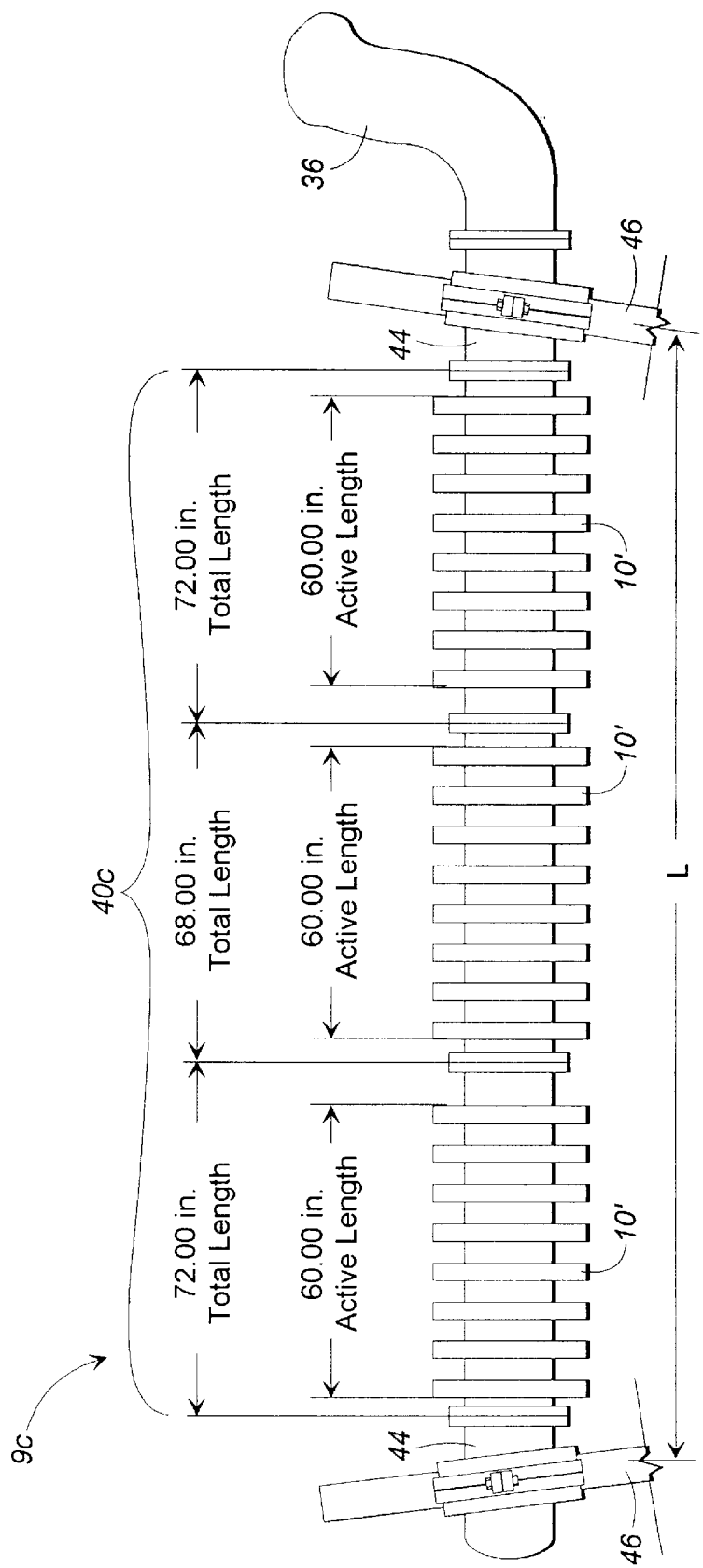

FIG. 11 depicts an exemplary suction system 9c which includes an elongated suction strainer 40c, comprised of three strainer sections 10' bolted end-to-end to one another to form a single elongated suction strainer supported at two ends by ring girders 46, and then connected by elbows to an ECCS pipe penetration. The dimensions shown are intended as examples only.

Figure 12:
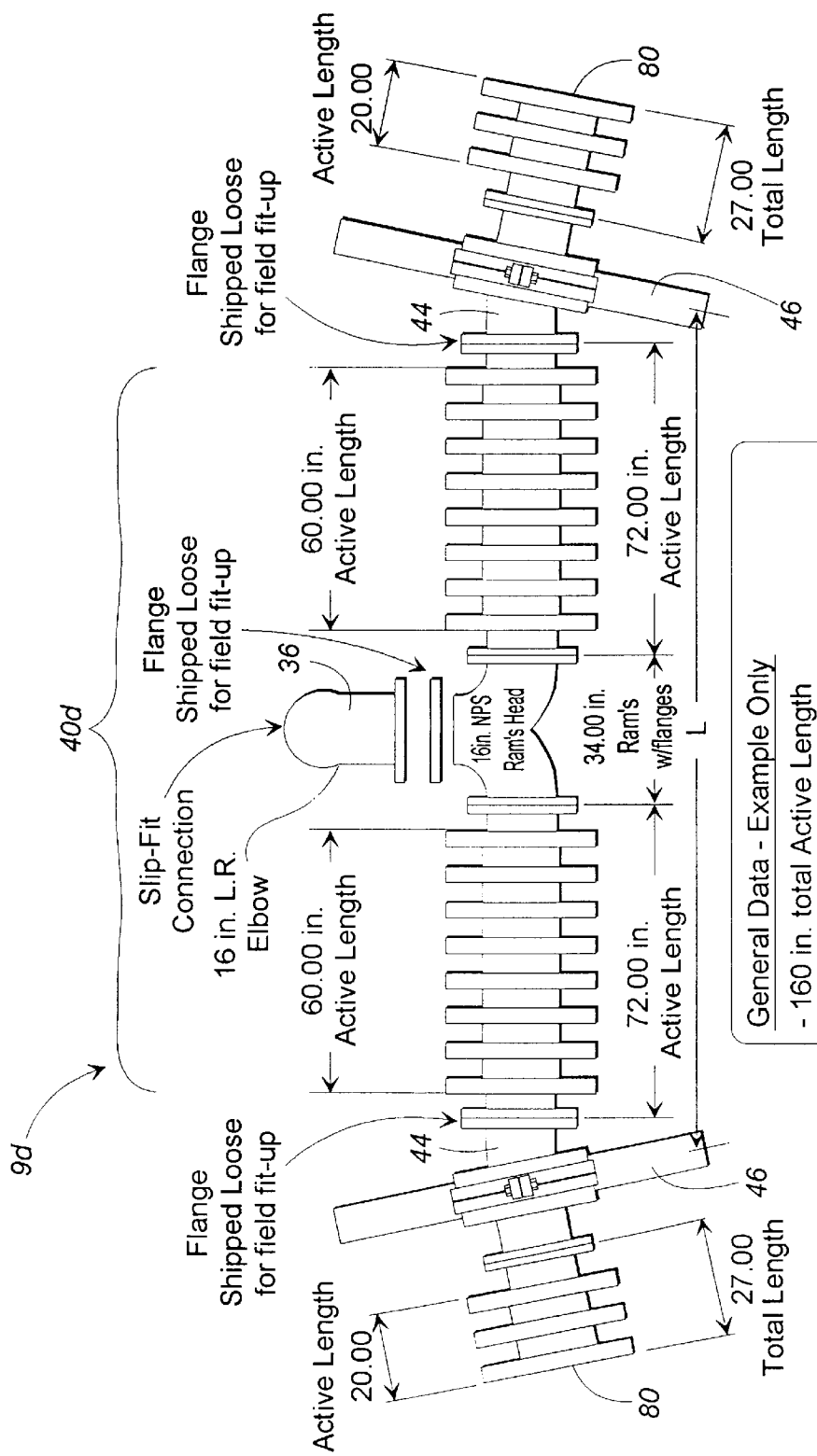

FIG. 12 is an exemplary embodiment of the suction system 9d which includes an elongated suction strainer 40d supported from ring girders 46. The suction system 9d further includes additional cantilevered suction strainers 80, of a type known in the prior art. The elongated suction strainer 40d and the two cantilevered strainers 80 are all connected to one ECCS pipe penetration 36. The dimensions shown are intended as examples only.

Figure 13:
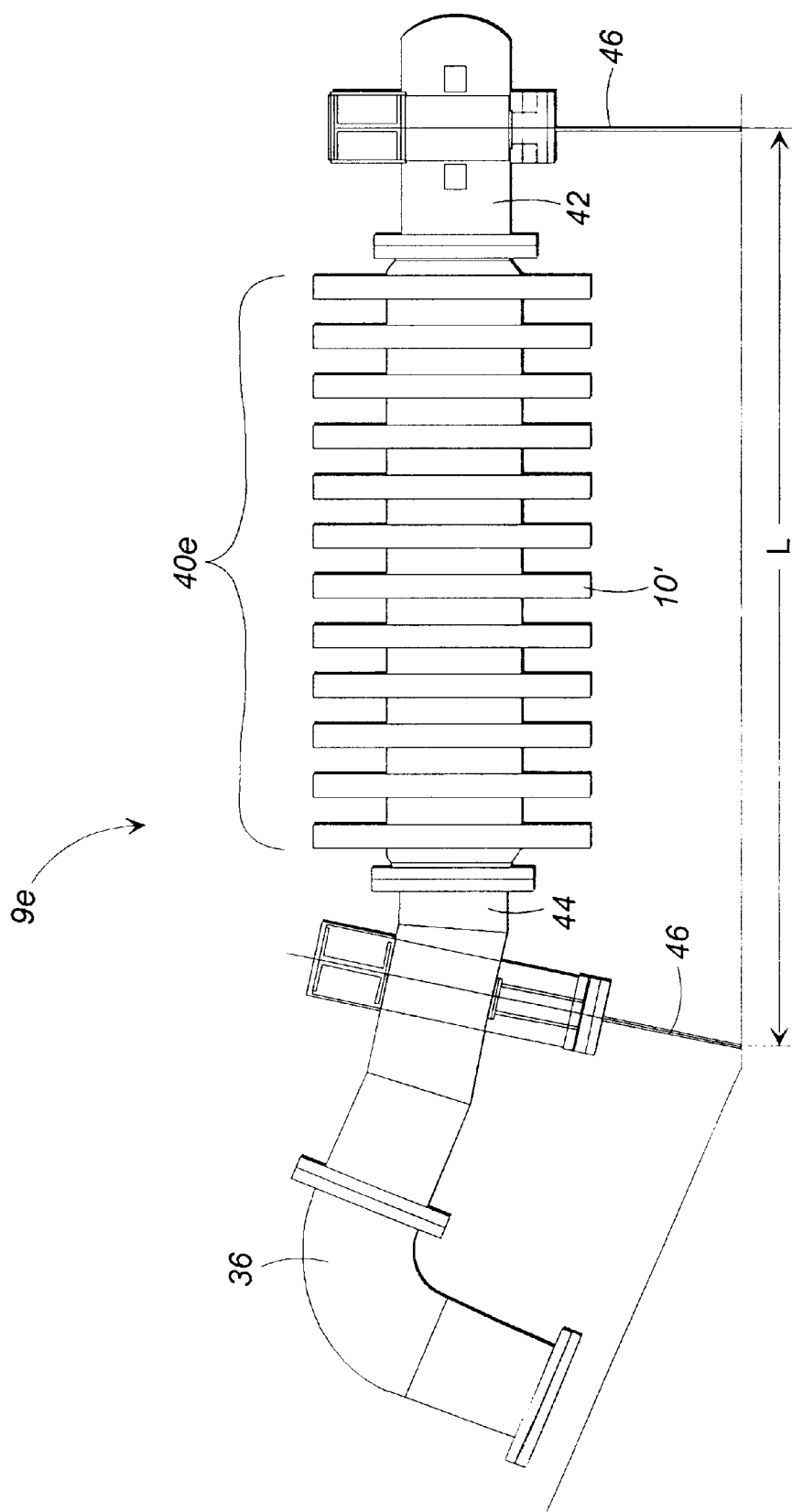

FIG. 13 depicts an exemplary suction system 9e which includes an elongated suction strainer 40e comprised of a single, elongated suction strainer section 10' supported at its two ends by ring girders 46 and which elongated suction strainer 40e is connected to suction pipe 36 through an end connection. By way of example, and without limitation, an exemplary free-span length "L" acceptable for this embodiment is approximately 150 inches.

Figure 14:
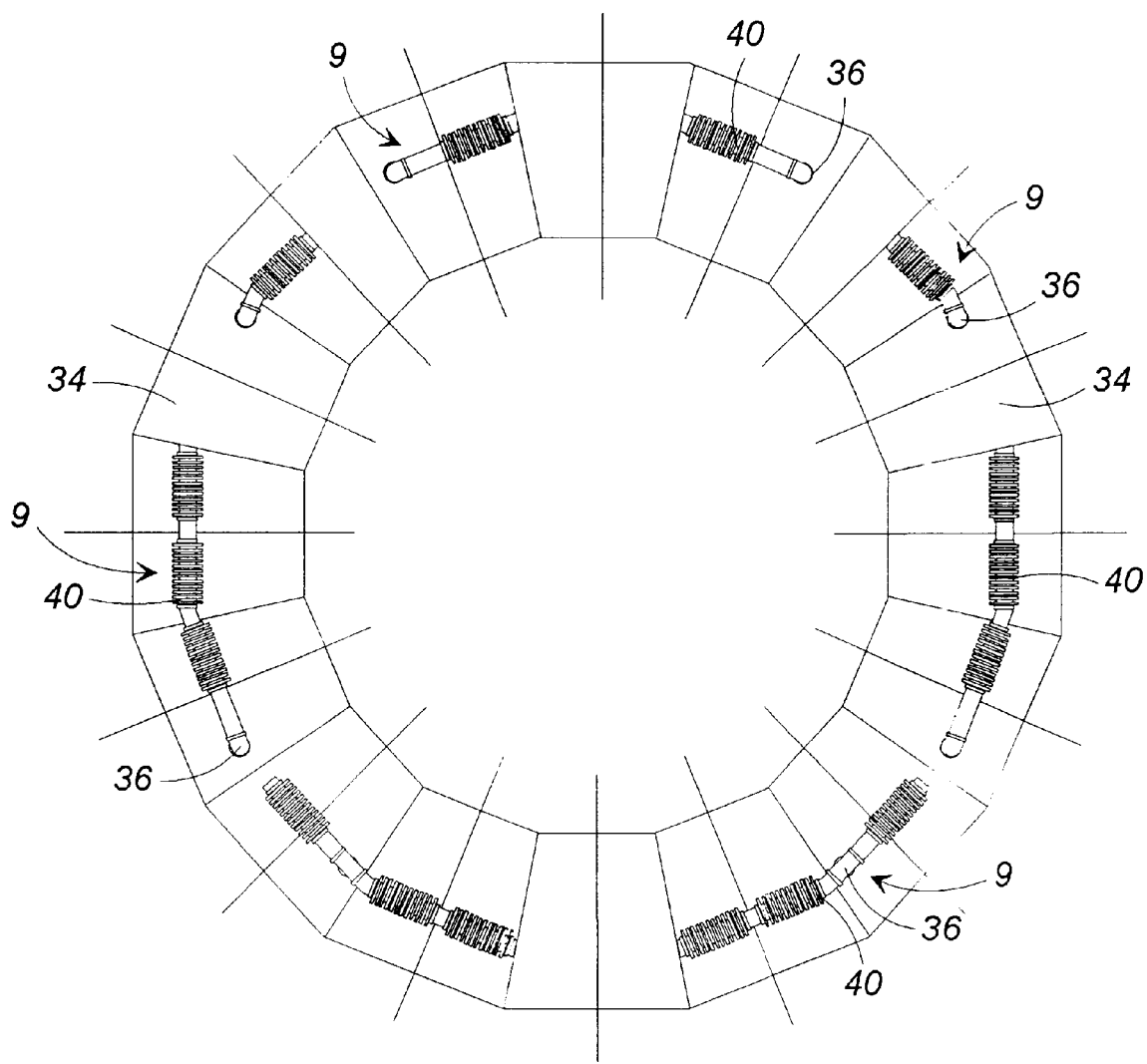
FIG. 14 is a schematic representation of a reservoir (e.g. a BWR suppression pool) in which are mounted a plurality of suction systems, in accordance with the present invention.

FIG. 14 is provided as a schematic representation of a reservoir (e.g. suppression pool of a BWR) outfitted with a plurality of suction systems, each including an elongated suction strainer 40 supported by structural members to reservoir walls 34, each elongated suction strainer 40 being connected to one of a plurality of suction pipe penetrations 36.

Figure 15:
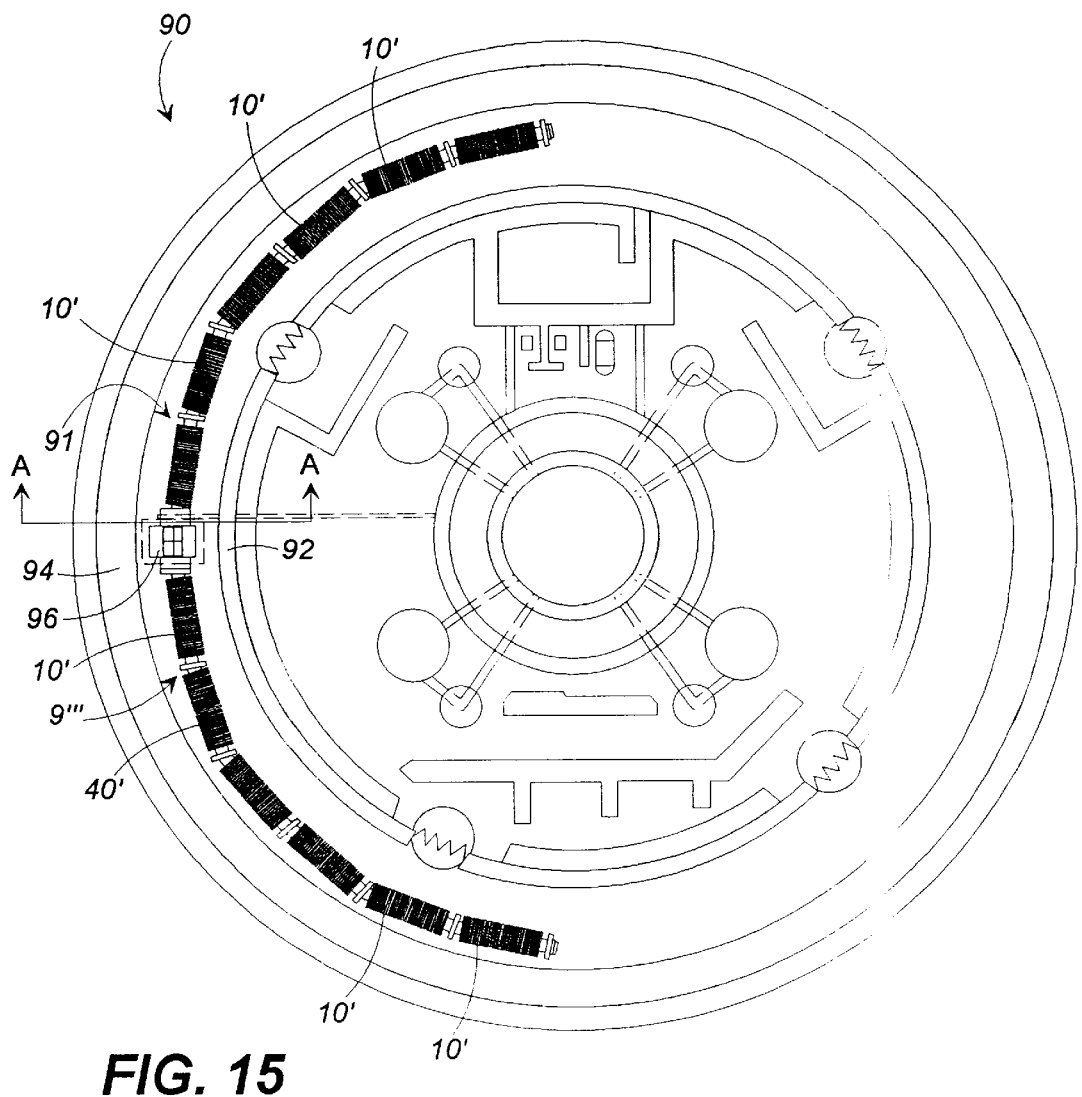
FIG. 15 is a plan view of a nuclear containment vessel of a pressurized water reactor (PWR) nuclear power plant retrofitted, in accordance with an alternate embodiment, with an elongated suction strainer of the present invention.
Figure 16:
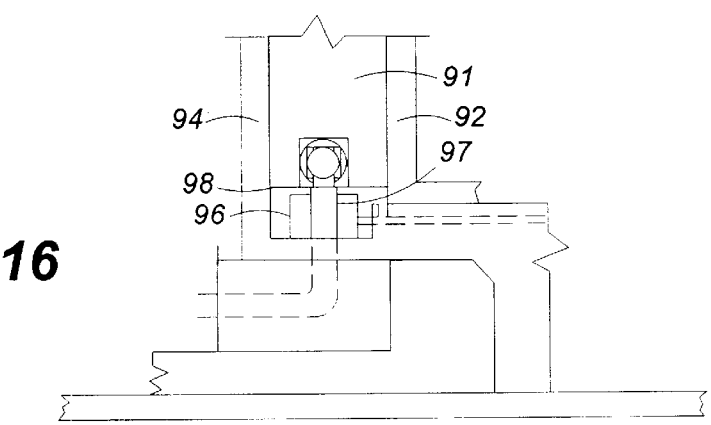
FIG. 16 is a cross-sectional view of the containment area of the pressurized water reactor nuclear power plant taken along line A—A of FIG. 15.

FIG. 15 shows a plan view of a PWR nuclear power plant retrofitted with a suction system 9''' of the present invention. As mentioned, unlike a BWR nuclear power plant, a PWR nuclear power plant does not utilize a suppression pool. Rather, a PWR nuclear power plant incorporates a containment area 91 which remains dry until an accident occurs. (The containment area 91, when flooded with water, functions as a fluid reservoir for purposes of this description). As shown in FIG. 15, the elongated suction strainer 40' of the present invention provides a means of increasing the overall surface area and straining capacity for the ECCS. As shown in FIGS. 15 and 16, an elongated suction strainer 40', comprised of a plurality of suction strainer sections 10' is positioned above the floor 93 of the containment area 91 between the containment wall 94 and the shield wall 92 of the PWR nuclear power plant. Through a series of flange connections and angled pipe sections (and supported, as necessary, at intervals by support members), the elongated suction strainer 40' is directed throughout the containment area 91 to maximize the overall straining surface area of the suction system 9''' of this embodiment. A pipe extension 95 is connected to the drain orifice within the sump pit 96 (the trash rack and debris screen being removed) and extends protruding out of the sump pit into the containment area 91 where, in the depicted embodiment, it is connected by the necessary pipe fittings to the two halves of the elongated suction strainer 40', in a manner that will be understood in light of the discussion of earlier suction system embodiments. It is to be understood that the elongated suction strainer 40' embodiment of FIG. 4 has been shown in FIGS. 15 and 16 to describe the suction system 9''' of this embodiment for use in PWR nuclear power plants. However, it is anticipated that any embodiment of elongated suction strainer 40, 40', 40", 40''' of this invention could be used as well.

In operation (in connection with, for example, BWR nuclear power plants), the suction system of the present invention is designed for installation in new BWR nuclear power plants and/or retrofit into existing BWR nuclear power plants. The suction system embodiment 9, 9', 9" includes generally an elongated suction strainer 40, 40', 40", respectively, which can be formed from a single suction strainer (not shown) or from a plurality of suction strainer sections 10, 10' connected end-to-end in series. The suction system further comprises a suction pipe 36 that protrudes into the suppression pool of a BWR nuclear power plant through a penetration in the suppression pool wall 34. The elongated suction strainer 40, 40', 40" is connected to the suction pipe 36 in any of the number of ways discussed hereinabove. The suction pipe 36 is tied to the recirculation system of the BWR nuclear power plant to provide fluid for the recirculation pumps.

When the ECCS or other recirculation pumps are engaged, fluid from the suppression pool of the BWR nuclear power plant is drawn into the suction system 9, 9', 9" through the exterior filtering structure 20 (and partial plate assemblies 26 if T-connections 50 are used), and then through the fluid inlets 18 of the internal core tube 12 (and apertures 64 of the core tube portion 52 if T-connections 50 are used) into the core chamber 16 (and bore 58 if T-connections 50 are used) of the elongated suction strainer 40, 40', 40". The fluid, thus strained of solids and other particulate matter, is then pumped out of the suppression pool through the suction pipe 36 to the reactor (not shown). The fluid is used to cool the core of the reactor and is then recirculated back to the suppression pool.

In the event of a LOCA, the core tube 12 of the elongated suction strainer 40, 40', 40" provides sufficient strength and stability so that the suction system 9, 9', 9" can withstand the extreme post-LOCA hydrodynamic forces discharged into the suppression pool of a BWR nuclear power plant. The result is an end-supported suppression pool suction system 9, 9', 9''' having a greater filtering surface area than heretofore known in the art.

It is to be understood that the suction system 9''' incorporating elongated suction strainer 40' shown in FIGS. 10 and 11 operates as described above. However, the suction system 9''' operates within the containment area of a PWR nuclear power plant rather than a suppression pool. Accordingly, the suction strainer 40' will only be exposed to water in the event of an accident. The containment area of a PWR nuclear power plant, unlike the suppression pool of a BWR nuclear power plant, remains dry until an accident occurs. In the event of an accident, the containment area is partially filled with water, sufficiently that the strainer's core tubes become submerged, and the suction system 9''' is then activated as described hereinabove.

While several preferred embodiments of the invention have been disclosed in the foregoing specification, it is to be understood by those skilled in the art that variations and modifications thereof can be made without departing from the spirit and scope of the invention as set forth in the following claims. In addition, the corresponding structures, materials, acts, and equivalents of all means or step plus function elements in the claims below are intended to include any structure, material or acts for performing the functions in combination with other claimed elements as specifically claimed herein.

What is claimed is:

1. An elongated suction strainer system for connection to a suction pipe of a recirculation system for removing solids from fluid flowing into the suction pipe, said elongated suction strainer system comprising:

a plurality of internal core tubes connected in series and each including a core wall defining a generally cylindrical core chamber and a plurality of spaced fluid inlets opening to said core chamber, each said core tube having first and second ends being adapted to support the suction strainer; and a series of exterior filtering structures connected to and at least partially bounding said core wall of said core tube, said filtering structure having a plurality of spaced perforations passing therethrough, and a plurality of plate assemblies spaced sequentially along and surrounding said core wall of each core tube;

whereby fluid is drawn through the perforations in the filtering structure and the fluid inlets in the core wall into the core chamber by the recirculation system and thereafter pumped to its destination.

2. The elongated suction strainer of claim 1, wherein said exterior filtering structure further includes a plurality of partial plate assemblies spaced along and eccentrically mounted to the core wall.

3. The elongated suction strainer of claim 1, wherein said ends of said core wall are each connected to the suction pipe of the recirculation system.

4. The elongated suction strainer of claim 3, wherein each of said ends of said core wall include a core tube extension sized and shaped to be attached to the suction pipe of the recirculation system.

5. The elongated suction strainer of claim 4, wherein each said core tube extension includes a flange for facilitating connection to the suction pipe of the recirculation system.

6. The elongated suction strainer of claim 1, wherein one of said ends of said core wall is aligned with and connected to the suction pipe of the recirculation system and wherein the other of said ends of said core wall is connected to a support structure.

7. The elongated suction strainer of claim 1, wherein said first end of said core wall is connected to a first support structure and said second end is connected to a second support structure.

8. An elongated suction strainer connected to the suction pipe of a recirculation system for removing solids from liquid flowing into the suction pipe, said elongated suction strainer being supported by the suction pipe and structural members and comprising:

a plurality of internal core tubes, each including a core wall having at least one open end and a plurality of spaced fluid inlets between the open ends, said core wall defining a generally cylindrical core chamber, at least one of said core tubes of said plurality of core tubes including a core wall having two open ends; and an exterior filtering structure including a plurality of concentric plate assemblies spaced sequentially along and surrounding at least one of said internal core tubes, and a plurality of partial plate assemblies spaced sequentially along and partially surrounding at least one of said internal core tubes, said filtering structure including a plurality of spaced perforations opening to said core tubes;

said plurality of internal core tubes being sequentially aligned and connected end to end along a common longitudinal axis, whereby fluid passes through the perforations in said filtering structure and the fluid inlets in the core wall to the chamber therein for delivery to its destination.

9. The elongated suction strainer of claim 8, wherein said elongated suction strainer further comprises a T-connection having a core tube portion and a suction pipe portion, said core tube portion including a core wall surface defining a generally cylindrical bore therethrough and having open ends, and said suction pipe portion including a suction wall surface defining a channel for connecting said bore to the suction pipe, and wherein said open ends of said core wall surface of said T-connections are aligned with and connected to said core walls of two said core tubes.

10. The elongated suction strainer of claim 9, wherein said core tube portion defines a plurality of apertures spaced along a portion of said core wall surface and opening to said bore, and wherein said partial plate assemblies surround that area of core wall surface having apertures therethrough.

11. The elongated suction strainer of claim 8, wherein one of said ends of said core wall of one of said core tubes of said plurality of core tubes is aligned with and connected to the suction pipe of a recirculation system and one of said ends of said core wall of another of said core tubes of said plurality of core tubes is aligned with and connected to the suction pipe of a recirculation system, and wherein at least one of said core tubes is attached to one of the structural members within the suppression pool so that said plurality of core tubes are supported by the suction pipe and the structural member.

12. The elongated suction strainer of claim 8, wherein said ends of said core walls include a core tube extension sized and shaped to be attached to the suction pipe of the recirculation system.

13. The elongated suction strainer of claim 8, wherein said core tube extension includes a flange for facilitating connection to the suction pipe of the recirculation system.

14. A suction system for removing solids from fluid contained in a reservoir formed of reservoir walls within a nuclear power plant or like facility, said system comprising:

a suction pipe protruding into the reservoir through a reservoir wall;

an elongated suction strainer including an elongated, hollow core tube defining an internal chamber between two opposed ends, said tube being connected to said suction pipe with the chamber in fluid communication with said pipe; and a plurality of fluid inlets defined along said tube placing the reservoir in fluid communication with said internal passage;

wherein said suction strainer is supported by said two opposing ends of said core tube from said reservoir walls.

15. The suction system of claim 14, wherein said two opposed ends of the core tube of said elongated suction strainer are each connected to said suction pipe, said suction pipe being constructed and arranged to independently support said elongated suction strainer within the reservoir.

16. The suction system of claim 14, further comprising a structural member protruding into the reservoir through the reservoir wall and wherein said structural member is attached to one of the ends of the core tube of said elongated suction strainer to provide support therefor.

17. The suction system of claim 16, wherein said structural member includes spaced first and second structural members and wherein the first structural member is mounted to one of the ends of the core tube and wherein the second structural member is mounted to the other of the ends of the core tube and wherein said suction pipe is connected to the core tube intermediate said first and second structural members.

18. The suction system of claim 17, wherein the core tube includes at least one T-connection intermediate the opposed ends of the core tube, said T-connection having a core tube portion defining a bore therethrough and a suction pipe portion defining a channel opening into the bore, the core tube portion being connected to the core tube with the bore in fluid communication with the internal passage and the suction pipe portion being connected to said suction pipe with the channel in fluid communication with said suction pipe.

19. The suction system of claim 18, wherein said at least one T-connection defines a plurality of apertures spaced along at least a portion of the core tube portion placing the bore in fluid communication with the reservoir.

20. The suction system of claim 14, wherein said elongated suction strainer comprises a plurality of suction strainer sections, each of said suction strainer sections having a hollow core tube, each of the hollow core tubes being aligned and connected end to end along a common longitudinal axis to provide fluid communication between the reservoir and said suction pipe.

21. An elongated suction strainer for connection to a suction pipe of a recirculation system for removing solids from fluid passing into the recirculation system from a fluid source, said elongated suction strainer comprising:

an end supported internal core tube including a core wall defining a generally cylindrical core chamber and a plurality of spaced fluid inlets opening to said core chamber, said core wall being constructed and arranged to support said elongated suction strainer; and an exterior filtering structure connected to and at least partially bounding said core wall of said core tube and having a plurality of plate assemblies spaced sequentially along and concentrically mounted to said core wall and partial plate assemblies eccentrically mounted to said core wall, said filtering structure defining a plurality of spaced perforations passing therethrough to provide fluid communication between the core chamber and the fluid source;

wherein fluid in the core chamber is thereafter drawn into the recirculation system substantially free of solids.

22. The elongated suction strainer of claim 21, wherein the ends of said core tube are aligned with and connected to the suction pipe of the recirculation system.

23. The elongated suction strainer of claim 22, wherein each of the ends of said core tube include a core tube extension sized and shaped to be attached to the suction pipe of the recirculation system.

24. The elongated suction strainer of claim 23, wherein each said core tube extension includes a flange for facilitating connection to the suction pipe of the recirculation system.

25. The elongated suction strainer of claim 21, further comprising a reservoir having at least one structural member therein, and wherein one of the ends of said core tube is aligned with and connected to the suction pipe of the recirculation system and wherein the other of the ends of said core tube is connected to the at least one structural member within said reservoir.

26. The elongated suction strainer of claim 21, wherein a plate assembly of said plurality of plate assemblies comprises:

a perforated plate inner ring;

a perforated plate outer ring circumferentially aligned with and spaced from said perforated plate inner ring;

a circumferential spacer positioned between said inner ring and said outer ring; and a pair of perforated disc plates oppositely arranged on said circumferential spacer, each of said pair of perforated disc plates having an inner periphery defining a central opening sized and shaped to receive said core tube and an outer periphery, said outer ring being positioned between said disc plates adjacent each outer periphery and said inner ring being positioned between said disc plates adjacent each inner periphery.

27. The elongated suction strainer of claim 20, wherein said internal core tube comprises a plurality of circumferentially spaced longitudinal ribs extending along the core wall for supporting said exterior filtering structure on said core tube.

28. An elongated suction strainer for connection to a suction pipe of a recirculation system having a reservoir defined by a reservoir wall, said strainer comprising:

a series of core tubes each having opposed first and second ends, a core wall defining a core chamber, and a series of spaced fluid inlets formed in said core wall and opening to said core chamber, external filtering structures mounted along said core tubes, each including a plurality of plate assemblies mounted in spaced series along the length of said core tubes and having a plurality of perforations formed therein to enable fluid to flow therethrough and into said core tubes through said fluid inlets; and a T-connection mounted between a series of said core tubes and having a core tube portion defining a bore therethrough and a suction pipe portion defining a channel opening in communication with said suction pipe;

whereby as fluid is drawn through said perforations of said plate assemblies and into said core tube, solids and particulate matter are strained from the fluid.

29. The elongated suction strainer of claim 28 and wherein said T-connection further includes a plurality of apertures spaced along said core tube portion through which fluid is drawn.

30. The elongated suction strainer of claim 28 and wherein an end of a core tube opposite said T-connection is supported on said reservoir wall.

* * * * *